W. POENICKE.
TREE BAND.
APPLICATION FILED JULY 22, 1912.
1,101,145.
Patented June 23, 1914.
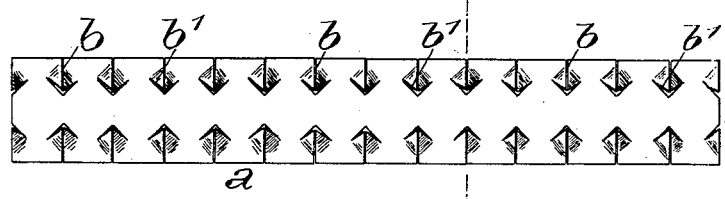
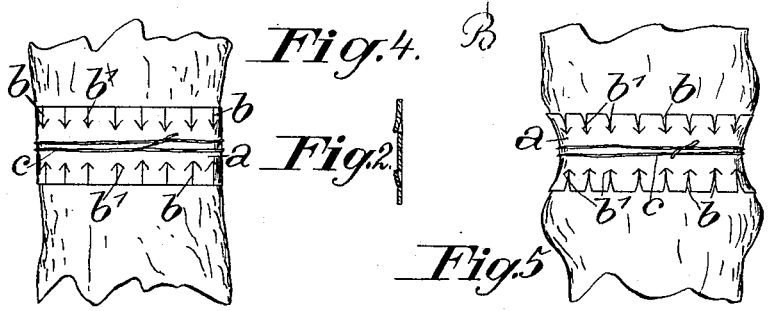
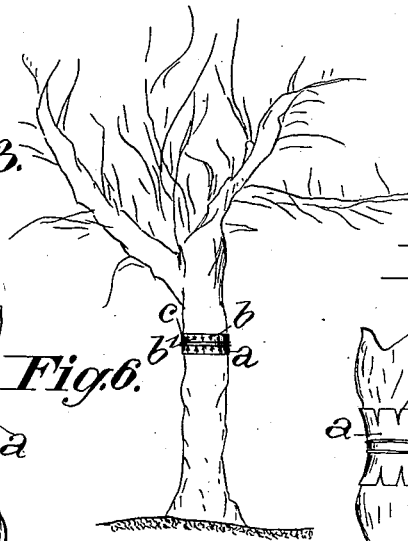
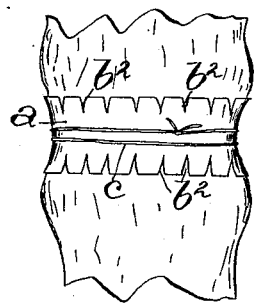

UNITED STATES PATENT OFFICE.

WALTER POENICKE, OF DELITZSCH, GERMANY.

TREE-BAND.

1,101,145.  Specification of Letters Patent.  Patented June 23, 1914.

Application filed July 22, 1912. Serial No. 710,997.

*To all whom it may concern:*

Be it known that I, WALTER POENICKE, gardener, a subject of the German Emperor, and residing at Delitzsch, Germany, have invented certain new and useful Improvements in Tree-Bands, of which the following is a specification.

The present invention refers to a protective strip for plants and more particularly for trees and shrubs of every description, which, when conveniently placed around the plant and secured, is able to bring about fertility prior to the natural period of maturity; at the same time preventing the cord from growing or cutting into the bark. In the configuration of the protective strip and the mode of fixing the same the way that the sap circulates in a plant or in a tree has been taken into account and also the growth in thickness of the plant at the corresponding place been considered.

The sap-circulation in the tree is, as is well known, taking place in two streams, fully separated from one another, *i. e.* the ascending stream of the raw soil-sucks in the interior rigid wood-body and the descending stream of the ready assimilated saps, moving themselves in the soft cells just being formed of the outer bast-layer. As the rigid wood-body is withstanding pressures from the outside, a rigid embracement of the trunk can under no circumstances put a stop to the ascending stream of the saps. On the other hand the descending courses of the sap gradually and completely lose their conductibility by means of a trunk-loop when the trunk, while growing, becomes thicker. Thereby, in accordance with certain physiological laws, an alteration of the sap-mixture in the body of the plant takes place, the nutrients being thereby no longer used for further growth; they are rather stored up, causing in this manner an intense ripening effect on the plant. When full loss of conducting power sets in and at last the loop grows deeply into the tree, the latter withers. When, however, the impediment is removed in due time the tree recovers soon again. The period between the placing the strip and the consecutive complete withering is a pretty long one; it is characteristical for each tree and cannot be calculated in advance.

By ring-barking the trunk, by which there is understood the decorticating of a bark-ring, or by putting around a wire-loop the same effect would have to be realized theoretically, as far as fertility is concerned, as by means of the present protective strip. This, however, does not hold good in practice. Ring-barking of the trunk greatly endangers the existence of the tree, which in most cases will wither as the bark removed does not grow up quickly enough and thus the impediment cannot be removed. A wire-loop however, would by far too quickly be overgrown by the arising bark-rolls; therefore, it would have to be removed prematurely *i. e.* long time before the full anticipation of fertility is insured, in order to prevent complete overgrowing. Else it grows fully into the tree, making it wither at all events. By applying, however, the new protective strip an anticipated abnormal fertility is insured without endangering the tree when properly applied. The strip may be left at its place until immediately before the plant is going to wither; so it allows of obtaining the maximum of effect as any danger of being overgrown is eliminated. As the trunk grows in thickness the border-partitions of the strip are being raised up by the masses of bark, newly formed, sufficiently until the jags that have the effect of struts are bearing against the central part. When such position is attained and the thickening is progressing further, the outer parts of the border-partitions of the protective strip are gradually bent up. The masses of bark pressing forward are thus forced back by the border partitions of the strip, rendering in this way an overgrowing of the strip a practical impossibility. By the protective strip being rigid in the center and not extensible, while it allows of extension toward the borders, such extension of the plant can take place without any difficulty above and below the crease. After having realized the effect wished for, the strip can be removed at any time. When applied conveniently the existence of the tree can never be endangered. I wish still to point out that such protective strip is not intended to extirpate caterpillars and other noxious insects.

On the accompanying drawing, in which the same numbers refer to the same parts throughout the several views, several forms of embodiments of the invention are represented by way of example. Therein—

Figure 1 shows a form of the protective strip before use, in elevation. Fig. 2 is a cross section taken on the line A—B of Fig. 1. Fig. 3 is illustrative of the protective strip placed around a tree-trunk and of the tree itself. Figs. 4 and 5 are views showing the protective strip immediately after and further a longer period after it has been placed around the strip having incisions according to Fig. 1. Figs. 6 and 7 illustrate a protective strip in the same positions having simple border-incisions.

The strip $a$ made of metallic sheet, hoop iron or other resistant material in lengths as required and in suitable width, is given along its longitudinal borders incisions $b$, allowing of a further extension of the strip at its upper and lower borders when the thickness of the tree-trunk is increasing. The incisions may be simply parallel, as in $b$ or even hook-like angular, as in $b'$, or they may have any shape whatever so it permits only of an extension of the diameter of the strip $a$ placed around and secured by cords $c$, in the direction toward the borders. Likewise simply shaped incisions as shown at $b^2$ in Figs. 6 and 7 may be provided.

Such protective strips are placed at any point whatever beneath those spots of a plant where there is to be put a crease or where increased fertility is to be obtained. After the result as intended is attained the strip is removed again in order to prevent a withering away of the plant.

The peculiar configuration of the device as prescribed prevents the bark of the plant-portion increasing in thickness from overgrowing the protective strip; the borders thereof are rather bent out unless they have not from the very outset a corresponding form while the central portion of the strip is rigidly embracing the trunk, all that to an amount as shown in Figs. 5 and 7. In this manner it is possible to leave the protective strip for a long time at one spot, without it being overgrown.

Having thus described my invention what I claim as new and desire to secure by Letters Patent is as follows, the right being reserved to such modifications as fall within the scope of the claims:—

1. A tree-band consisting of a strip of hard material, said strip having a rigid central portion and resilient longitudinal sides.

2. A tree-band consisting of a strip of hard material, said strip having a rigid central portion and resilient longitudinal sides said sides having portions cut off.

3. A tree-band consisting of a strip of hard material having a rigid central portion and incisions in its longitudinal sides for making said sides bendable for bending.

4. A tree-band consisting of a strip of hard material having a rigid central portion and yielding longitudinal sides, and means for securing said strip formed in the shape of a hook, to a plant.

In testimony whereof, I affix my signature in the presence of two witnesses.

WALTER POENICKE.

Witnesses:
 RUDOLPH FRICKE,
 ERNST HENSCHL.